United States Patent [19]
Hickerson et al.

[11] Patent Number: 6,065,089
[45] Date of Patent: May 16, 2000

[54] METHOD AND APPARATUS FOR COALESCING I/O INTERRUPTS THAT EFFICIENTLY BALANCES PERFORMANCE AND LATENCY

[75] Inventors: Roger Hickerson; Craig C. McCombs, both of Wichita, Kans.

[73] Assignee: LSI Logic Corporation, Milpitas, Calif.

[21] Appl. No.: 09/104,487

[22] Filed: Jun. 25, 1998

[51] Int. Cl.[7] ....................................................... G06F 9/46
[52] U.S. Cl. .............................. 710/266; 710/48; 709/102
[58] Field of Search ...................... 710/48, 266; 709/102

[56] References Cited

U.S. PATENT DOCUMENTS

| | | | |
|---|---|---|---|
| 3,905,025 | 9/1975 | Davis et al. .......................... | 340/172.5 |
| 5,317,745 | 5/1994 | Chan ........................................ | 395/700 |
| 5,404,536 | 4/1995 | Ramakrishnan et al. ................ | 395/725 |
| 5,437,039 | 7/1995 | Yuen ........................................ | 395/725 |
| 5,535,380 | 7/1996 | Bergkvist, Jr. et al. ................. | 395/540 |
| 5,568,649 | 10/1996 | MacDonald et al. .................... | 395/868 |
| 5,727,227 | 3/1998 | Schmidt et al. .......................... | 395/800 |

Primary Examiner—John A. Follansbee

[57] ABSTRACT

A method and apparatus for generating an interrupt signal. A counter value is decremented each time a task is completed by a slave processor. The counter value is incremented each time a task is read by the slave processor. A delay value is set using the counter value. An interrupt is generated after a period of time set by the delay value has passed. The counter value is compared to a threshold value. The interrupt is generated upon detecting a condition in which the counter value is less than the threshold value or when the completion queue is full instead of after the period of time.

29 Claims, 9 Drawing Sheets

```
/*
 *
 *
 * An I/O Interrupt Coalescing Method That Efficiently Balances Performance and Latency
 *
 * Roger Hickerson
 * Craig McCombs
 *
 */

/* User Programmable Options */
U32    ScalingMethod    = 1;         // The Scaling Method is set to 1 for a
                                     // single step scale, or 2 for a multiple
                                     // step scale.

U32    MinimumThreshold = 0;         // This value specifies a lower limit.
                                     // If the number of Active IO Tasks a less
                                     // than this value, a IO Completion Interrupt
                                     // will be generated immediately U32    MaximumThreshold = 0;         // This value specifies a upper limit. If the
                                     // number of Active IO Tasks is greater than
                                     // this value, the delay value will be
                                     // limited by this value.

U32    StepIncrement    = 1;         // This value specifies the step increment
                                     // for the timer delay value U32    Delay            = 1;         // This value specifies the smallest
                                     // increment of time that is appropriate
                                     // for the delay timer.
```

*FIG. 8A*

```
/* Local Working Variables */
U32    ActiveToTaskCounter = 0;      // This value counts the number of Active IO
                                     // Tasks in the system, by incrementing each
                                     // time a new IO task is dequeued, and
                                     // incrementing each time an Active IO Task
                                     // is queued U32    PendingToTaskEventFlag = 0;   // This flag is set when at least one IO Task
                                     // is pending, and reset when all IO Tasks
                                     // have completed.

struct CommandQueue    CommandQueue;  // The Command Queue and the Completion Queue
                                      // are the interfaces from the adapter to the
                                      // host system.
struct CompletionQueue CompletionQueue;
```

*FIG. 8B*

```
/*
 * Procedure: CommandQueueRead
 *
 * Read an IO Task from the Command Queue, and increment the number
 * of Active IO Tasks
 */

CommandQueueRead ()
{
void *IoTask;

/* Read the Command Queue */
    IoTask = CommandQueue.Read;
    /* Increment the total number of IO tasks in the subsystem */
    ActiveIoTaskCounter++;
}
```

*FIG. 8C*

```
/*
 * Procedure: CompletionQueueWrite
 *
 * Write an IO Task to the Completion Queue, and decrement the number
 * of Active IO Tasks, and set the IO Task Event Flag.
 */

CompletionQueueWrite ()
{
void *IoTask;

/* Write the Command Queue */
    CommandQueue.Write = IoTask;
    /* Decrement the total number of IO tasks in the subsystem */
    ActiveIoTaskCounter--;
    /* If PendingIoTaskEventFlag is not set, set it */
    if ( PendingIoTaskEventFlag == 0 )
        PendingIoTaskEventFlag = 1;
```

*FIG. 8D*

```
/*
 * Procedure: DelayInterrupt
 *
 * Generate I/O Completion Interrupt if pending I/O task flag set and the
 * number of Active Commands is less than minimum threshold. After
 * generating the interrupt, reset the pend I/O task flag.
DelayInterrupt ()
{
U32 IoCount, TimeToWait;

/* If PendingIoTaskEventFlag is not set, return */
    if ( PendingIoTaskEventFlag == 0 )
        return;
    /* If minimum threshold has not been met, generate
       an interrupt immediately */
    If ( ActiveIoTaskCounter < MinimumThreshold )
        GenerateIoCompletionInterrupt () ;
        /* Reset the PendingIoTaskEventFlag */
        PendingIoTaskEventFlag = 0;
        return;
}
```

*FIG. 8E*

If Action I/O Task counter ≥ minimum threshold then scale delay
using either method #1 or #2 and then generate interrupt.

```
/* Scaling Method #1 : Delay is always at the maximum */
if ( ScalingMethod == 1 )
{
    IoCount = MaximumThreshold;
}
else
{
    /* Scaling Method #2 : Delay is incremented in steps */
    IoCount = ActiveIoTaskCounter * StepIncrement;
    /* If the Current Delay is greater than the Maximum Delay
        limit the Current Delay to that maximum value */
    if ( IoCount > MaximumThreshold )
        IoCount = MaximumThreshold;
}
/* Start a timer that will complete after Delay time, stop timer if completion queue become full
   and subsequently call the generate interrupt procedure*/

TimeToWait = IoCount * Delay;

StartTimer ( TimeToWait, Completion Qfull, Generate Interrupt );
    return;
```

*FIG. 8F*

```
/*
 * Procedure: Generate Interrupt
 *
 * Called when the Timer expires. Generates an interrupt, and
 * resets the PendingIoTaskEventFlag.
 */
GenerateInterrupt ()
{
    /* Generate the IO Completion Task interrupt */
    GenerateIoCompletionInterrupt () ;
    /* Reset the PendingIoTaskEventFlag */
    PendingToTaskEventFlag = 0;
    return;
```

METHOD AND APPARATUS FOR COALESCING I/O INTERRUPTS THAT EFFICIENTLY BALANCES PERFORMANCE AND LATENCY

BACKGROUND OF THE INVENTION

1. Technical Field

The present invention relates generally to an improved data processing system and in particular to an improved method and apparatus for generating interrupts in a data processing system. Still more particularly, the present invention provides a method and apparatus for generating input/output interrupts in a data processing system.

2. Description of the Related Art

In a data processing system, such as a workstation or personal computer, a network adapter is often present as an interface device that is located between a network and the input/output (I/O) bus of a workstation or personal computer to be connected to the network. Data packets flow through the adapter in both directions and the adapter forms functions, such as making sure that packets do not get lost and processing data packets received from the network are to be transmitted onto the network. In processing data packets received from the network, the adapter will generate an interrupt that is sent to the host processor to indicate that a data packet has been received and requires processing. An "interrupt" is an adapter's request for attention from the processor. When the processor receives an interrupt, it suspends its current operations, saves the status of its work, and transfers control to a special routine known as an interrupt handler or interrupt service routine (ISR), which contains the instructions for dealing with the particular situation that caused the interrupt. Interrupts can be generated by various hardware devices to request service or report problems, or by the processor itself in response to program errors or requests for operating-system services. Interrupts are the processor's way of communicating with the active elements that make up a computer system.

In processing an interrupt, overhead is present which may reduce the processing efficiency of the data processing system. I/O interrupt processing overhead typically includes (1) saving the application's current state, (2) executing the I/O interrupt service routine (ISR) and then (3) restoring the application's state so execution can continue from where it was interrupted. Interrupt service routine is a special routine that is executed when a specific interrupt occurs. Interrupts from different sources have different interrupt service routines to carry out processes to handle the interrupt. These interrupt service routines may include, for example, updating a system clock, reading the keyboard, or processing a data packet received by an adapter. The occurrence of multiple I/O interrupts increases the amount of overhead used to process these interrupts. This situation may decrease the efficiency of the data processing system, especially when many interrupts occur frequently.

Therefore, it would be advantageous to have an improved method and apparatus for generating interrupts.

SUMMARY OF THE INVENTION

The present invention provides an improved method and apparatus for generating an interrupt signal. A counter value is decremented each time a task is completed by a slave processor. The counter value is incremented each time a task is initiated by the slave processor. Each time a task is completed, the completion of the task is written into a completion queue. A delay value is set using the counter value. An interrupt is generated after a period of time set by the delay value has passed. The counter value is compared to a threshold value. The interrupt is generated without delay upon detecting conditions in which either the counter value is less than the threshold value or the task completion queue is full.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
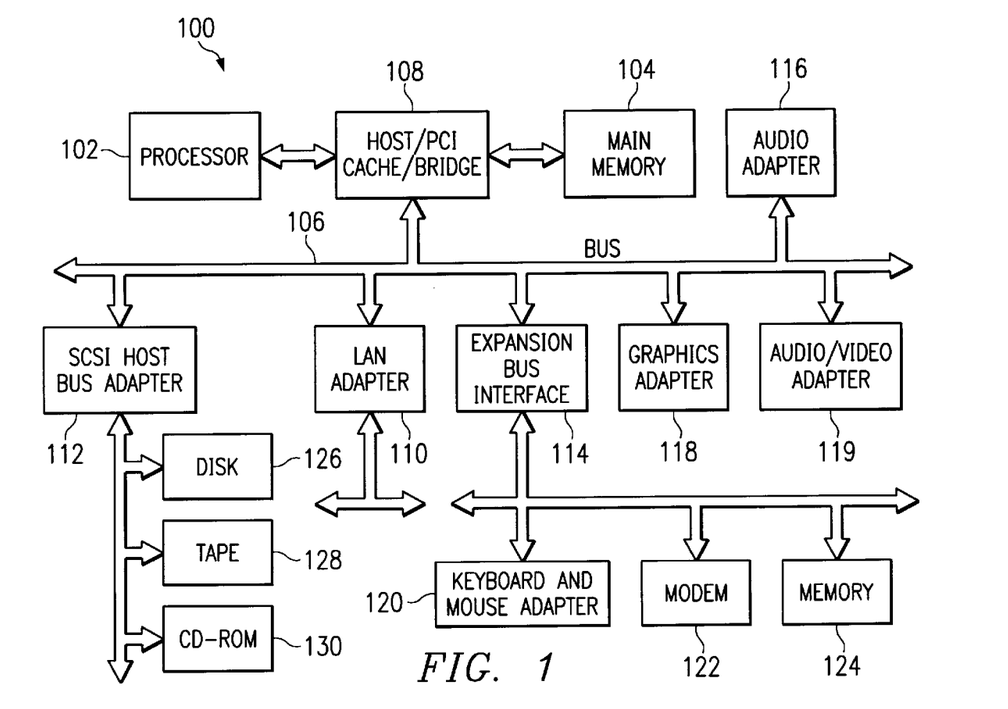
FIG. 1 is a block diagram of a data processing system in which the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

The present invention provides a method and apparatus for coalescing I/O interrupts in a manner that efficiently balances performance and latency within a data processing system. Latency with respect to I/O tasks is defined as the elapsed time from the file system I/O request until the file system I/O completion. The present invention is employed to reduce the present number of completion I/O interrupts to one or less per read or write I/O task. The processes of the present invention may be implemented within various I/O adapters in a data processing system, such as, for example, LAN adapter 110 or SCSI host bus adapter 112 in FIG. 1.

Figure 2:
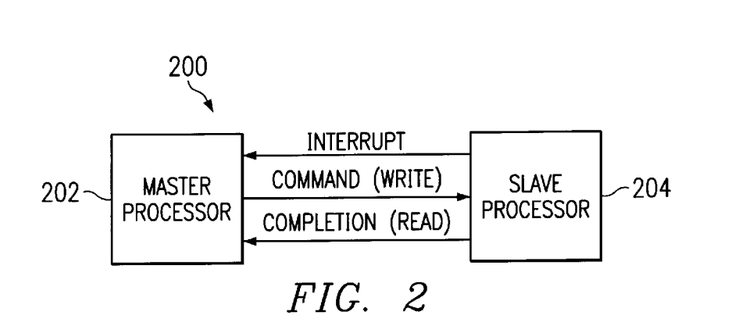
FIG. 2 is a block diagram of a processor system in which the present invention may be implemented in accordance with a preferred embodiment of the present invention.

Turning now to FIG. 2, a block diagram of a processor system in which the present invention may be implemented is depicted in accordance with a preferred embodiment of the present invention. The processes and apparatus of the present invention may be implemented using any two processors that communicate with each other. Processor system 200 contains master processor 202 and slave processor 204. Master processor 202 writes a command to slave processor 204. In turn, slave processor 204 processes the command and generates a completion that is read by master processor 202. In addition, slave processor 204 will generate an interrupt that is sent to master processor 202 for master processor 202. Those of ordinary skill in the art will appreciate that the interface between the master and slave processor can be implemented such that the slave processor reads commands from shared memory and the slave processor writes completions to the same shared memory. Master processor 202 and slave processor 204 may be any processors within a data processing system, such as data processing system 100 in FIG. 1. The present invention may also be implemented in a system with multiple master processors and multiple slave processors. The present invention also may be implemented in other processor to processor communications, such as, for example, a symmetrical multi-processor (SMP) and a system area network (SAN) used in multi-system clusters.

Figure 3:
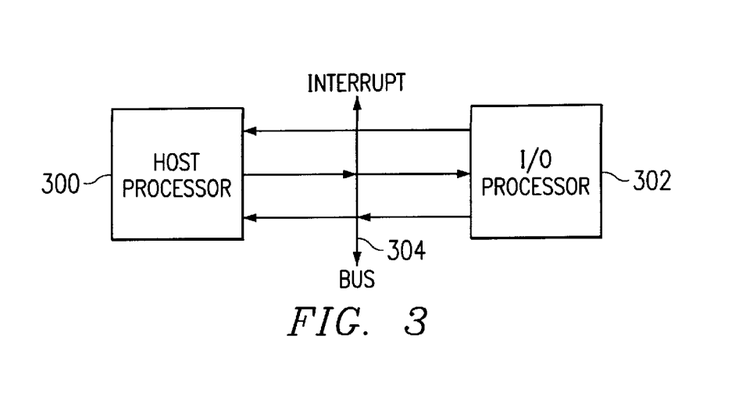
FIG. 3 is a diagram of a host processor and an I/O processor in which the present invention may be implemented.

In FIG. 3, a diagram of a host processor and an I/O processor is illustrated in which the present invention may be implemented. Host processor 300 is connected to I/O processor 302 by bus 304 in the depicted example. Commands are written to I/O processor 302 by host processor 300 across bus 304. Completions are read by host processor 300 from I/O processor 302 across bus 304. Additionally, I/O processor 302 generates an interrupt, causing a routine, such as interrupt service routine, to process the interrupt. Host processor 300 may be implemented using processor 102 in FIG. 1, while I/O processor 302 may be found in an adapter, such as, for example, LAN adapter 110 or graphics adapter 118 in data processing system 100 in FIG. 1. Additionally, I/O processor 302 may be found in other I/O host adapters, such as a SCSI adapter, a fibre channel arbitrated loop (FC-AL) adapter, a 1394 adapter, or a universal serial bus (USB) adapter.

Figure 4:
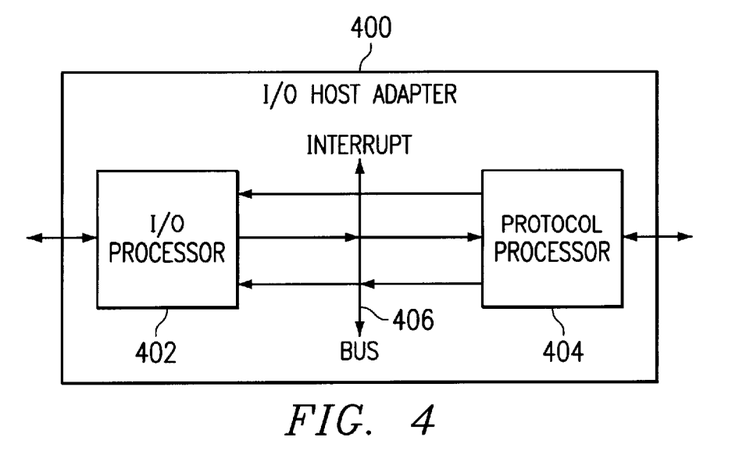
FIG. 4 is a block diagram of an I/O host adapter in which the present invention may be implemented.

With reference now to FIG. 4, a block diagram of an I/O host adapter is depicted in accordance with a preferred embodiment of the present invention. I/O host adapter 400 in the depicted example, contains two processors, an I/O processor 402 and a protocol processor 404 connected to each other by bus 406. I/O processor 402 may be implemented using a number of known processors, including an ARM microprocessor core available from Advanced RISC Machines Ltd, located in Cambridge, England, and having an office in Austin, Tex. Protocol processor 404 may be implemented using a number of different processors, such as another ARM microprocessor or a specialized sequencer. I/O processor 402 will write commands to protocol processor 404 which in turn will process the commands. Completed commands are read by I/O processor 402 as completions from protocol processor 404 are finished.

Figures 5, 6:
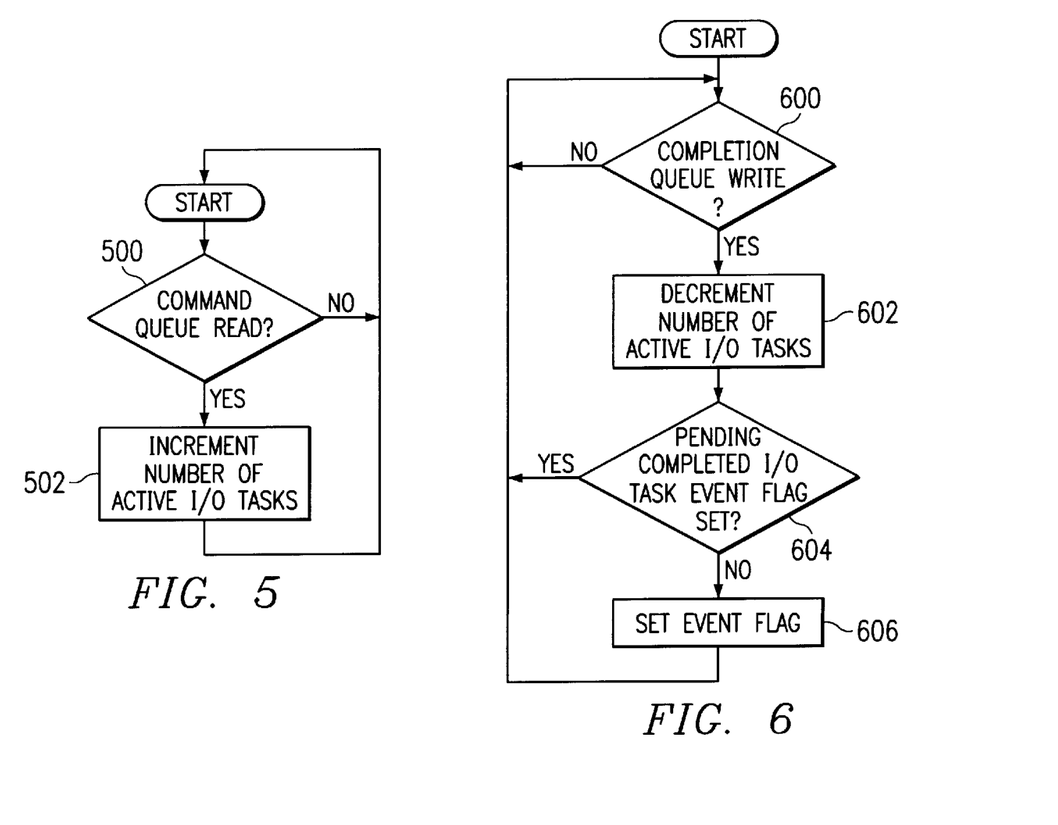
FIG. 5 is a flowchart of a process for processing a command queue in accordance with a preferred embodiment of the present invention.
FIG. 6 is a flowchart of a process for processing a completion queue in accordance with a preferred embodiment of the present invention.

Turning next to FIG. 5, a flowchart of a process for processing a command queue is depicted in accordance with a preferred embodiment of the present invention. The process begins by determining whether the command queue read has occurred (step 500). This read of the command queue is performed by the processor (i.e., slave processor 204 in FIG. 2) that generates the interrupt. If the command queue has not been read, the process then returns to step 500. Otherwise, the number of active I/O tasks are incremented (step 502).

With reference now to FIG. 6, a flowchart of a process for processing a completion queue is depicted in accordance with a preferred embodiment of the present invention. The process begins by determining whether a completion queue write has occurred (step 600). This write is made by a processor, such as slave processor 204. If an entry has not been written into the completion queue, the process returns to step 600. Otherwise, the number of active I/O tasks is decremented (step 602). Then, a determination is made as to whether a pending completed I/O task event flag has been set (step 604). In the depicted example, the event flag may be implemented as a register bit that can be sampled or accessed by a software routine. This flag is used to indicate when an interrupt is pending. If the pending completed I/O task event flag has not been set, the process then sets the event flag (step 606) with the process then returning to step 600. This event flag may be set numerous ways. For example, in a software implementation, a register may be set. In a hardware implementation, a flip flop may be set to indicate the flag. With reference again to step 604, if the event flag has been set, the process returns to step 600.

Figure 7:
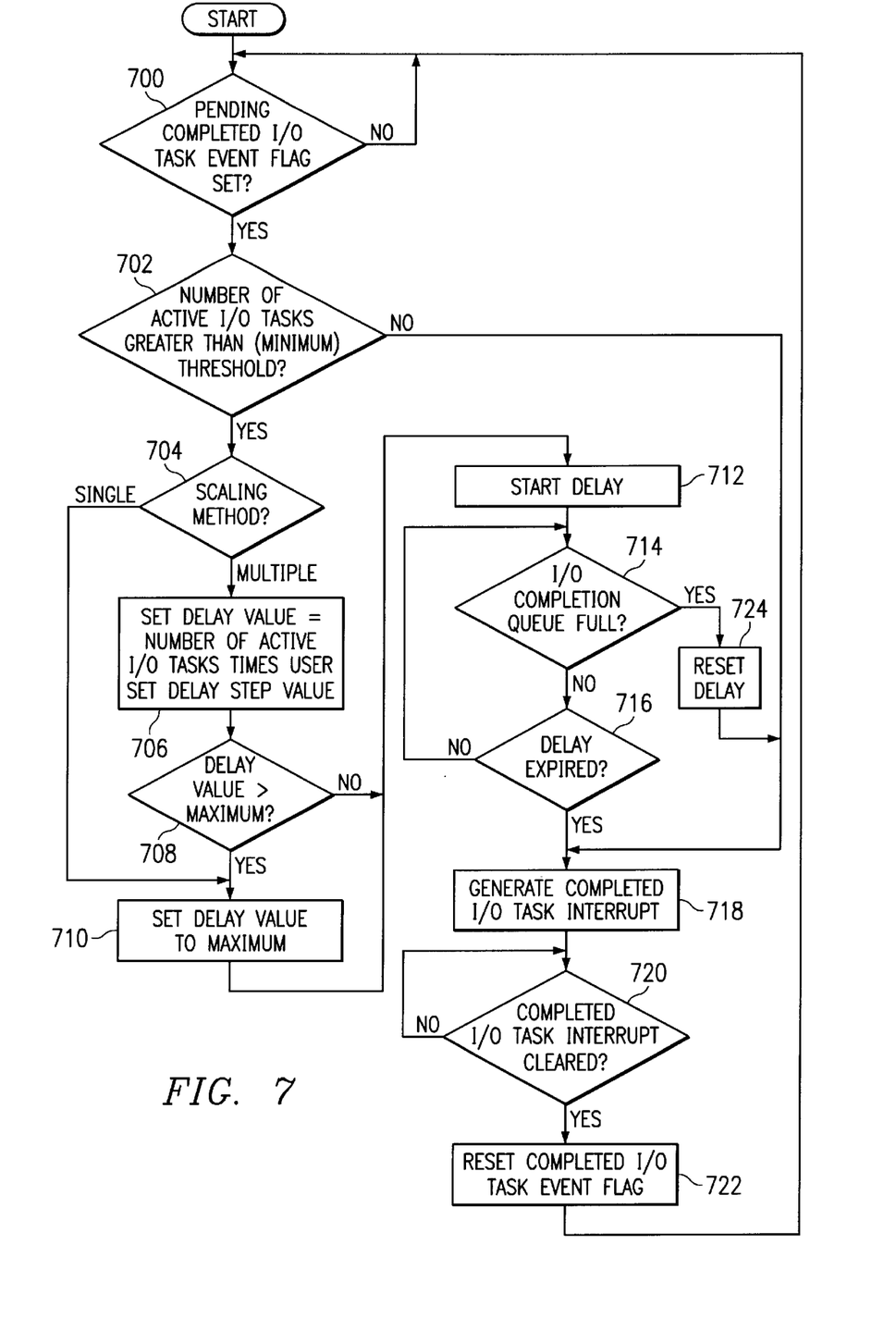
FIG. 7 is a flowchart of a process for generating an interrupt signal in accordance with a preferred embodiment of the present invention.

With reference now to FIG. 7, a flowchart of a process for generating an interrupt signal is depicted in accordance with a preferred embodiment of the present invention. The process begins by determining whether a pending completed I/O task event flag has been set (step 700). If the flag has not been set, the process returns to step 700. Upon detecting the event flag being set, a determination is then made as to whether the number of active I/O tasks is greater than a threshold value (step 702). This threshold value is a minimum threshold. If the number of active I/O tasks is greater than the minimum threshold, a determination is made as to whether to use a single step scaling method or a multiple step scaling method (step 704). If a multiple step scaling method is to be used, a delay value is set equal to the number of active I/O tasks multiplied by a user set delay step value (step 706). A determination is then made as to whether the delay value is greater than a maximum delay value (step 708). If the delay value is greater than a maximum delay value, the delay value is then set equal to the maximum delay value (step 710). The delay is then started (step 712). This delay may be implemented by hardware or software, using mechanisms, such as, for example, timers or counters. With reference again to step 708, if the delay value is not greater than a maximum, the process proceeds directly to step 712. With reference to step 704, if the scaling method is to be a single step scaling method, the process proceeds to step 710 to set the delay value to a maximum and then to step 712 as described above.

After the delay values have been set and the delay has been started, a determination is then made as to whether the I/O completion queue is full (step 714). If the completion queue is not full, the process then continues to make a determination as to whether the delay has expired (step 716). If the delay has not expired, the process returns to step 714. Otherwise, a completed I/O task interrupt is generated (step 718). The process also generates a completed I/O task interrupt in step 718, if the number of active I/O tasks is not greater than a minimum threshold in step 702. After the completed I/O task interrupt has been generated, a determination is made as to whether the completed I/O task interrupt has been cleared (step 720). If the interrupt has not been cleared, the process then returns to step 720. Otherwise, the process resets the completed I/O task event flag (step 722) and returns to step 700.

With reference again to step 714, if the completion queue is full, the delay is reset (step 724) and the process then generates a completed I/O task interrupt (step 718).

Figure 8A:
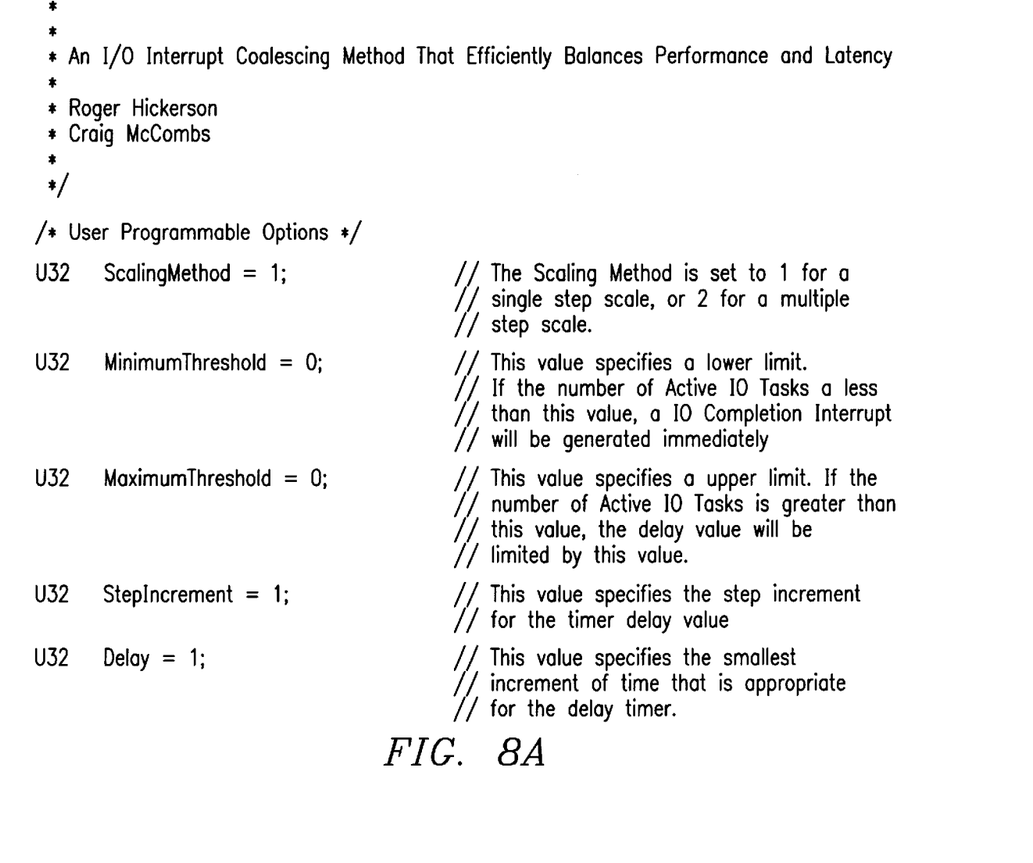
FIGS. 8A–8G are software instructions used to implement an I/O interrupt coalescing method that efficiently balances performance and latency in accordance with a preferred embodiment of the present invention.
Figure 8B:
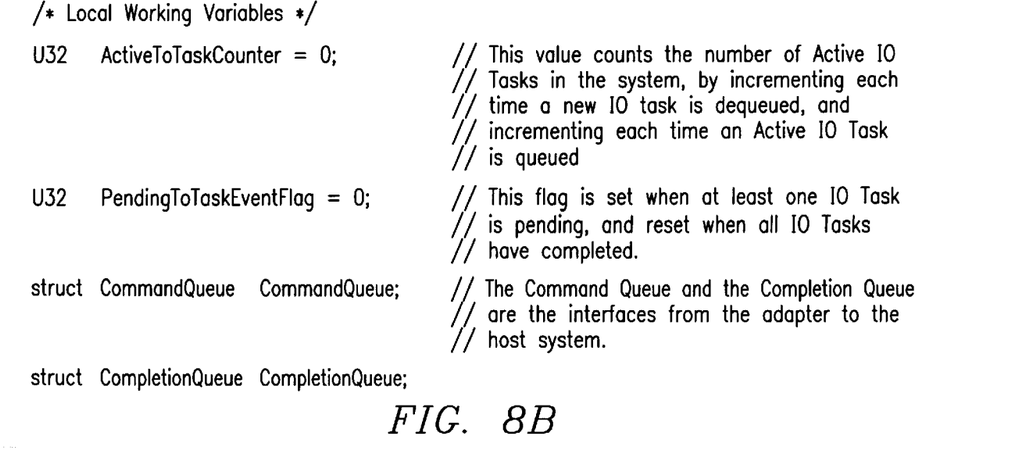
Figure 8C:
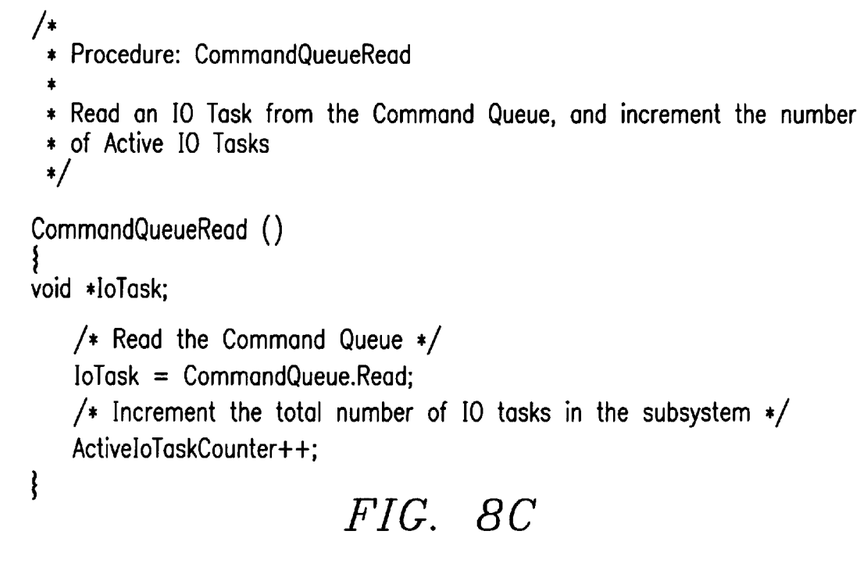
Figure 8D:
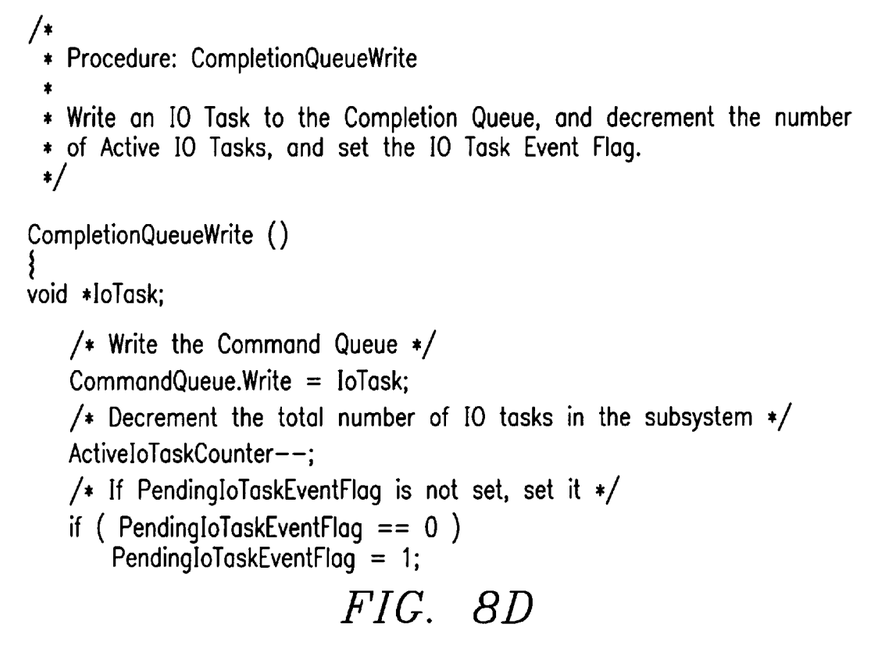
Figure 8E:
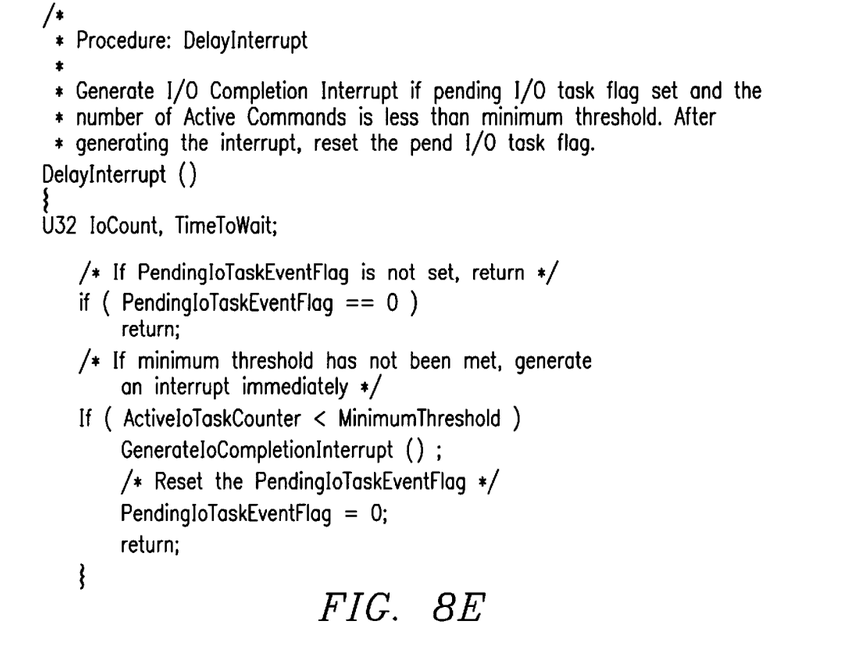
Figure 8F:
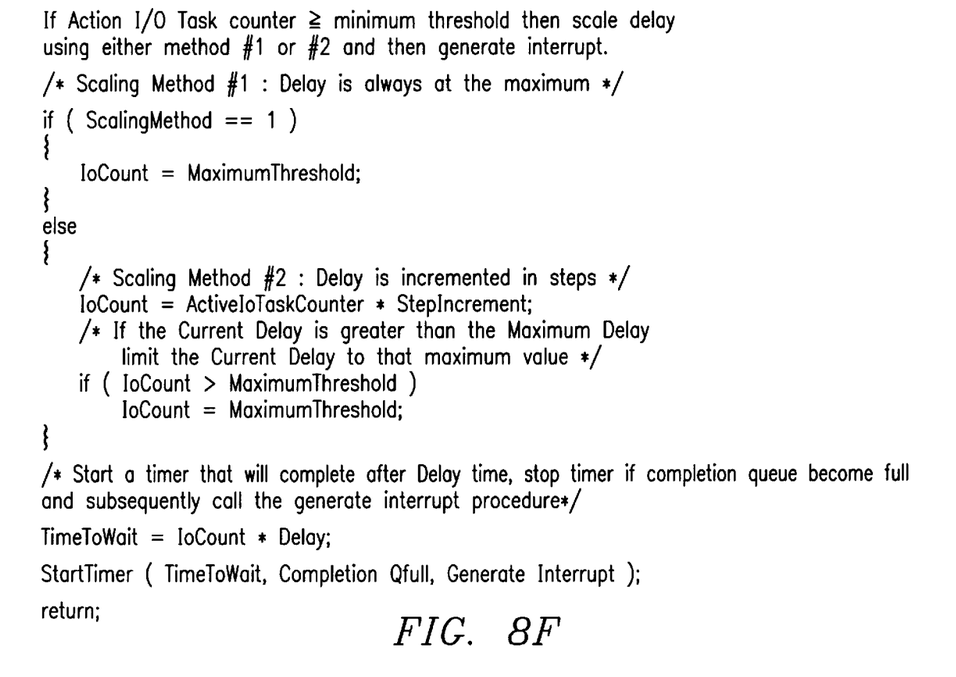
Figure 8G:
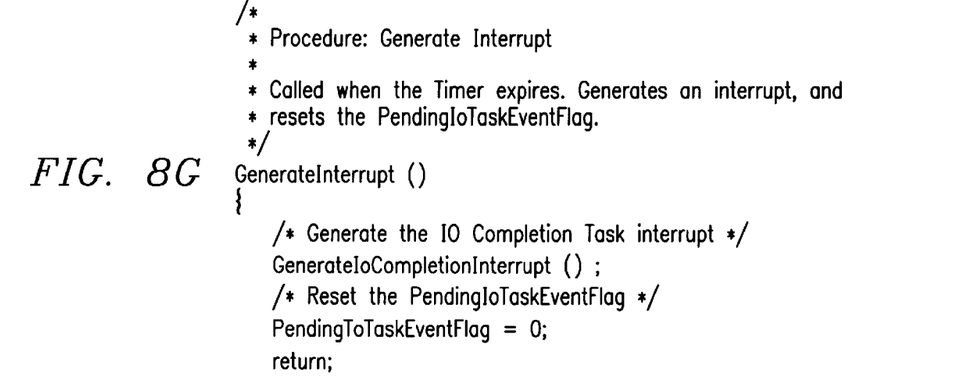

Turning now to FIGS. 8A–8G, software instructions used to implement an I/O interrupt coalescing method that efficiently balances performance and latency are depicted in accordance with a preferred embodiment of the present invention. These figures illustrate instructions that implement the processes illustrated in FIGS. 5–7. FIGS. 8A and 8B depict user programmable options and local working variables used in I/O interrupt coalescing. FIG. 8C illustrates instructions for a command queue read procedure. This procedure reads an I/O task from the command queue and increments the number of active I/O tasks. FIG. 8D illustrates instructions for a completion queue write procedure. This procedure writes an I/O task to a completion queue, decrements the number of I/O tasks, and sets an I/O task event flag if not already set. FIG. 8E depicts instructions used to generate an interrupt without a delay. If a pending I/O task event flag is set, this procedure generates an I/O completion interrupt if the active I/O task counter is less than a minimum threshold. In addition, the procedure will reset the pending I/O task event flag to zero. FIG. 8F shows instructions for a single step and multiple step scaling method. These instructions set a delay based on the selected scaling method and starts a timer that will complete after the delay time. The generate interrupt procedure in FIG. 8G is called when the timer started in FIG. 8F expires. This procedure generates an interrupt and resets the pending I/O task event flag. If the completion queue becomes full before timer expires, the timer is reset and the interrupt is generated immediately (not shown).

Figure 9:
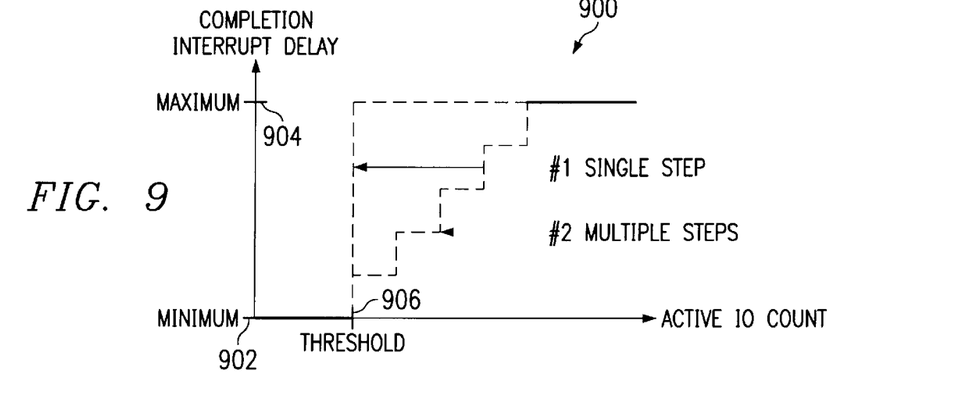
FIG. 9 is a diagram illustrating single step and multiple steps scaling methods in accordance with a preferred embodiment of the present invention.

With reference now to FIG. 9, a diagram illustrating single step and multiple steps scaling methods is depicted in accordance with a preferred embodiment of the present invention. Graph 900 is used to illustrate a single step scaling method and a multiple step scaling method. Each scaling method is used to provide a programmable delay. The y-axis is used to identify the completion interrupt delay, which in the depicted example has a minimum 902 and a maximum 904. The x-axis identifies the active I/O count and has a threshold 906. In a single step method, the delay is set to a minimum until the active I/O count is equal to threshold 906. At that time, the delay is then set to equal maximum 904. In this method, the delay moves from minimum 902 from maximum 904 in a single step. With a multiple step method, the delay steps from minimum 902 to maximum 904 in a number of steps, which may be set using various mechanisms. For example, the delay may be set by subtracting the threshold count from the active I/O count, with the delay always being less than or equal to maximum 904. This mechanism produces equal delay steps. Alternatively, unequal delay steps may be employed based upon various factors, such as, for example, active I/O count and other system loading, or overhead performance parameters.

Figure 10:
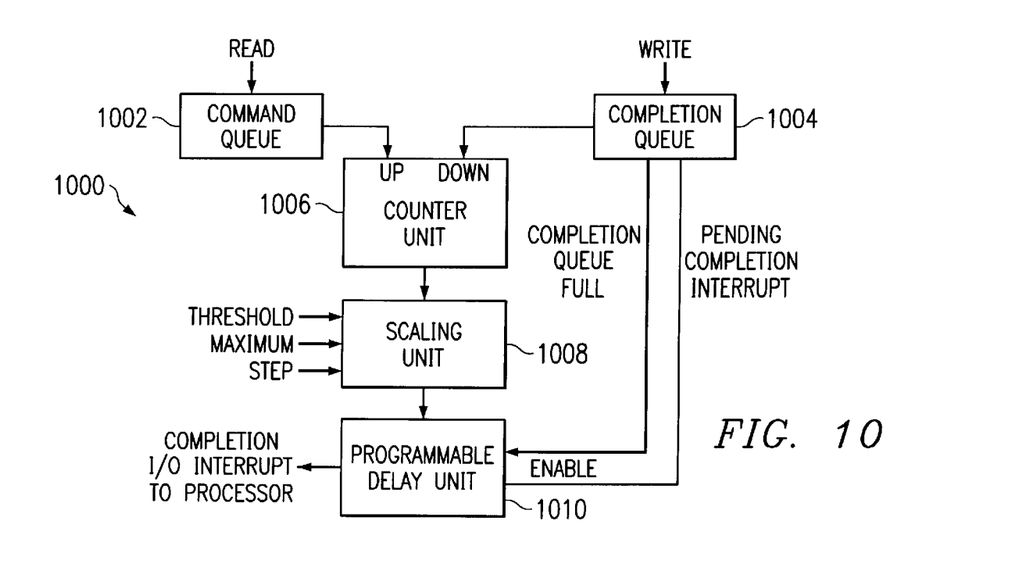
FIG. 10 is a functional block diagram of an I/O interface for optimizing processing efficiency and reducing I/O latency in accordance with a preferred embodiment of the present invention.

The depicted example in FIG. 10 provides a method and apparatus for optimizing processing efficiency and reducing I/O latency by reducing I/O interrupts even when an I/O workload profile is changing. In FIG. 10, I/O interface 1000 includes a command queue 1002 and a completion queue 1004, which are connected to counter unit 1006. In turn, counter unit 1006 has its output connected to its scaling unit 1008, which is connected to programmable delay unit 1010. Both command queue 1002 and completion queue 1004 may reside in either the host, containing the master processor, or in the adapter, containing the slave processor. Alternatively, one of the queues may reside in the host and the other in the adapter. Command queue 1002 in I/O interface 1000 contains a pointer or message. This pointer or message is written into command queue 1002 each time an application issues a new I/O task to the I/O subsystem in which I/O interface 1000 is located. For example, I/O interface 1000 may be contained within LAN adapter 110 in FIG. 1. Pointers and messages are used to identify specific I/O tasks. When pointers are used, each pointer points to a structure that contains I/O tasks or descriptions of I/O tasks. Messages are used to describe I/O tasks. Combinations of pointers and messages may be used in the depicted examples. Each time the I/O subsystem finishes processing an I/O task, a pointer or message is written to completion queue 1004. Each time a pointer or message is read from command queue 1002, counter unit 1006 is incremented. Each time a message or pointer is written to completion queue 1004, counter unit 1006 is decremented. As a result, the value within counter unit 1006 represents the total number of active I/O tasks in the I/O subsystem. I/O concatenation, which involves the combination of multiple I/O tasks into a single, larger I/O task, will not change the function of counter unit 1006 because the concatenation operation is typically performed by the I/O subsystem after processing the I/O pointers or messages held in command queue 1002. With respect to completion queue 1004, the function of counter unit 1006 will not change by the I/O system which deposits all concatenated I/O completion pointers or messages in I/O completion queue 1004 at or near the same time.

When an I/O subsystem finishes an I/O task, by writing a pointer or message to completion queue 1004, a pending completion interrupt is typically generated immediately and remains active until this interrupt is cleared by an I/O interrupt service routine when the completion queue is emptied. The actual transmission of the completion interrupt to the processor or processors may be held or delayed by programmable delay unit 1010. In addition, the pending completion interrupt generated by completion queue 1004 and the actual completion interrupt controlled by programmable delay unit 1010 is immediately reset if completion queue 1004 is cleared or emptied. In the depicted example, if completion queue 1004 becomes full prior to a delay period ending, an I/O completion interrupt is immediately issued and the timer timing the delay period is reset.

Scaling unit 1008 converts the output of counter unit 1006 to a desired completion interrupt delay input value that is sent to programmable delay unit 1010. Scaling unit 1008 is controlled by a programmable threshold value, a maximum delay value, and a step value that may be set by the user through software. This software may set or periodically adjust these parameters of scaling unit 1008 as may be determined by collecting host performance and efficiency metrics. The software scaling unit may be executed on the host processor or, if applicable, on an I/O adapter, containing a processor. These host performance and efficiency metrics, may include, for example, CPU utilization, interrupt service routine overhead, I/O latency, and processor context store and restore time.

For single-threaded workload profiles, the value in counter unit 1006 will either be a zero or a one. Scaling unit 1008 has a threshold set to a value greater than one so that the resulting delay generated by programmable delay unit 1010 is zero. This configuration ensures low latency for a single-threaded I/O, which is extremely important for this type of workstation I/O workload profile. As the number of active I/O tasks in the system increases above the established minimum threshold, scaling unit 1008 will enable a larger pending completion interrupt delay, up to the established maximum delay value. Once the maximum completion interrupt delay is reached, additional increases the active I/O task count will not change the delay. For servers with pulse or cyclic I/O workload profiles, this pending completion interrupt delay will reduce the total number of interrupts to the application by enabling processing of multiple I/O completion during a single execution of the interrupt service routine. Although in the depicted example, scaling unit 1008 is shown as a separate function, the functionality of this unit may be combined with other components shown in FIG. 10. For example, the function provided by scaling unit 1008 may be combined with counter unit 1006 or merged into programmable delay unit 1010.

Figure 11:
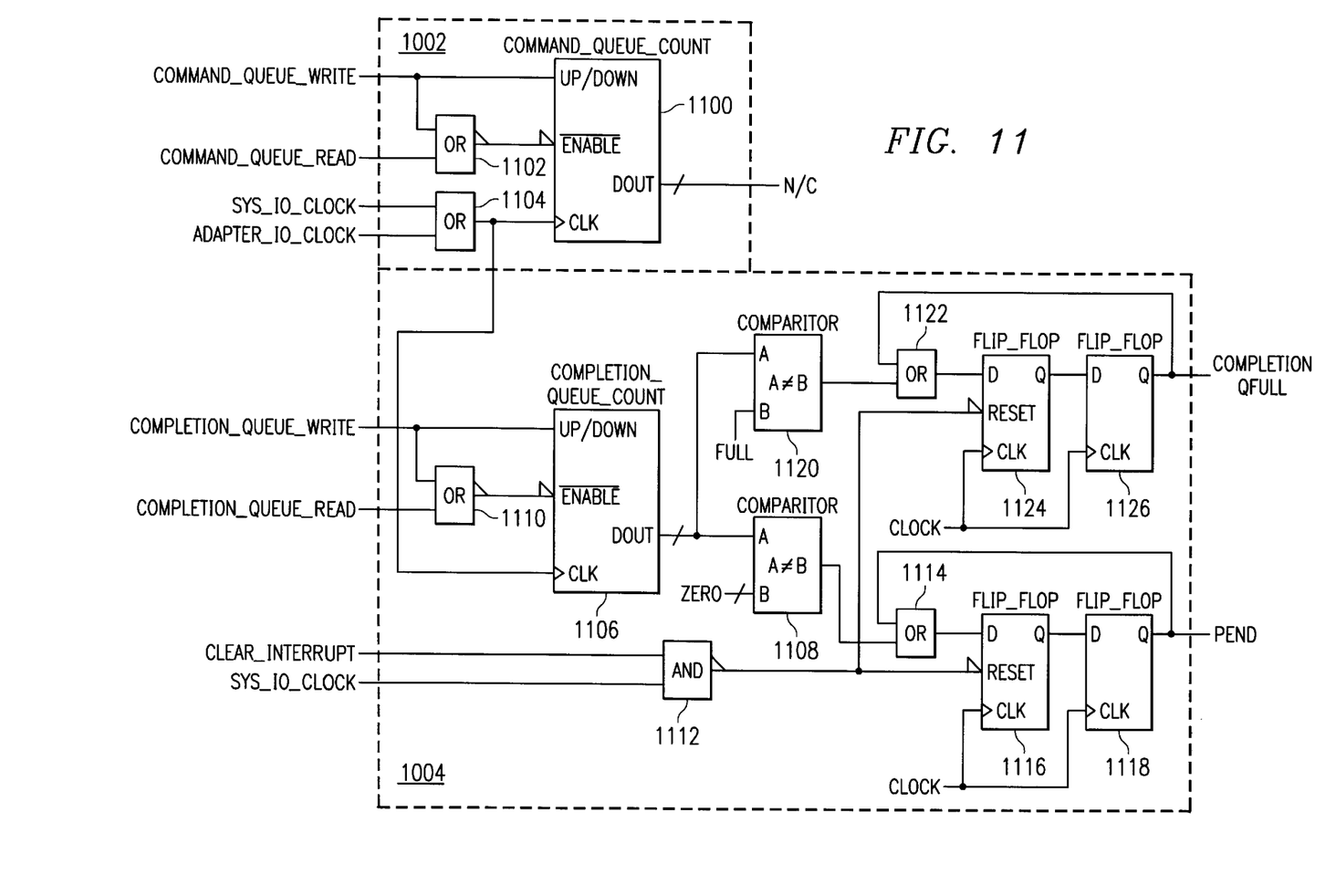
FIG. 11 is a logic diagram of a command queue and a completion queue in accordance with a preferred embodiment of the present invention.

With reference now to FIG. 11, a logic diagram of a command queue and a completion queue is depicted in accordance with a preferred embodiment of the present invention. In the depicted example, command queue 1002 includes counter 1100, NOR gate 1102, and OR gate 1104. The output of NOR gate 1102 is connected to the enable input of counter 1100. The output of OR gate 1104 is connected to the clock input for counter 1100. Command queue 1002 also includes memory and other associated circuitry (not shown). Counter 1100 increments when commands are written to command queue 1002. The writing of commands is indicated by a Command_Queue_Write signal being applied to the up/down input of counter 1100 and NOR gate 1102. Counter 1100 is decremented when a Command_Queue_Read signal is applied to NOR gate 1102, indicating that a command has been read from command queue 1002. A command queue write is performed by the system or the master processor, while a command queue read is performed by an adapter or slave processor. The output of counter 1100 is sent to a pending command queue register (not shown) that can be read by either the master processor or the slave processor.

Completion queue 1004 includes counter 1106, comparator 1108, NOR gate 1110, NAND gate 1112, OR gate 1114, D flip-flop 1116, and D flip-flop 1118. The output of NOR gate 1110 is connected to the enable input of counter 1106. The output of OR gate 1104 is connected to the clock input signal of counter 1106. The output of counter 1106 is connected to one input of comparator 1108. A signal having a logic zero is applied to the other input to comparator 1108. The output of comparator 1108 is connected to the input of OR gate 1114. The other input to OR gate 1114 is connected to the output of flip-flop 1118. OR gate 1114 has its output connected to the D input of D flip-flop 1116. In turn, the output of flip-flop 1116 is connected to the D input of D flip-flop 1118. Completion queue 1004 also includes other circuitry not shown. For example, memory for storing completions and associated circuitry are not shown to avoid obscuring the features of the present invention. Counter 1106 increments when a task has been completed. This completion is indicated by applying a Completion_Queue_Write signal to counter 1106 and NOR gate 1110. Counter 1106 is decremented when an entry is read from completion queue 1004. Counter 1106 is decremented by applying a Completion_Queue_Read signal to NOR gate 1110. Clock signals are supplied to counters 1100 and 1106 by a system I/O clock, Sys_I/O_Clock, or by an adapter I/O clock, Adapter_I/O_Clock. A completion queue write is performed by an adapter or slave processor while a completion queue read is performed by a system or master processor.

Comparator 1108 is used to determine whether any completion queue entries are still pending. Each entry contains the information needed to describe an I/O task. The entry may be, for example, a pointer to a structure containing the information or a small structure containing the information. The number of pending completions is output from counter 1106 into comparator 1108. A zero is also input into comparator 1108. If the completion queue is not empty as indicated by counter 1106, comparator 1108 generates a signal that is synchronized to a state machine, which will be described in more detail below. This synchronization is accomplished using a clock (CLOCK) applied to the clock inputs of D flip-flops 1116 and 1118 to generate a pending completion interrupt signal (PEND), which is asserted until a clear interrupt signal (Clear_Interrupt) is applied to NAND gate 1112, which causes flip flop 1116 to be reset when the system I/O clock also is applied to NAND gate 1112.

Counter 1106 also has its output connected to one input of comparator 1120, which has a second input that receives a completion queue full value (FULL). This completion queue value is set to indicate when the completion queue is full. In other words, when the output of counter 1106 is equal to or greater than the completion queue full value, a completion queue full (Completion Q Full) signal is generated. This signal is synchronized in a manner similar to the pending completion interrupt signal (PEND) using OR gate 1122, D flip-flop 1124, and D flip-flop 1126.

Figures 12, 14:
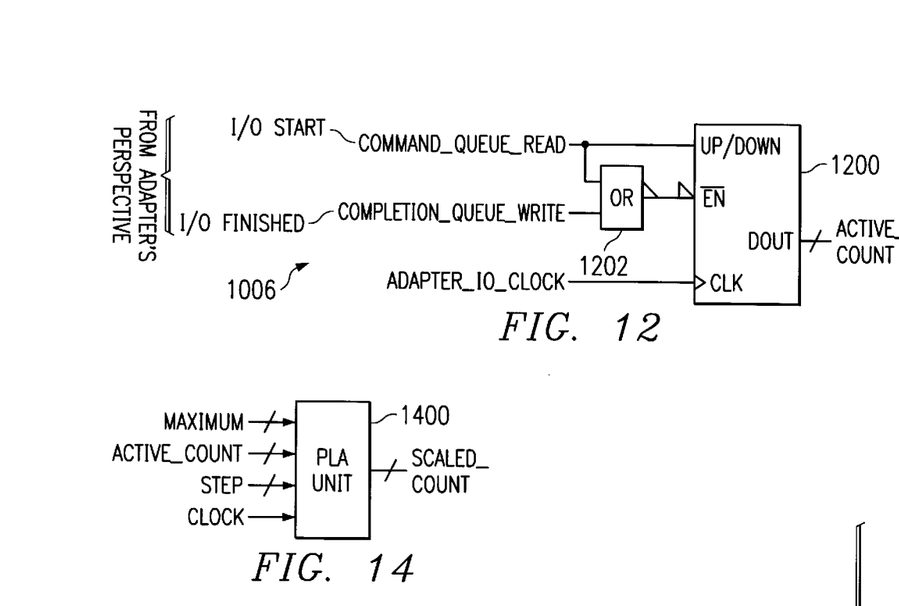
FIG. 12 is a logic diagram of a counter in accordance with a preferred embodiment of the present invention.
FIG. 14 is a logic diagram of hardware in a scaling unit used to implement scaling methods in accordance with a preferred embodiment of the present invention.

Turning now to FIG. 12, a logic diagram of a counter from FIG. 10 is depicted in accordance with a preferred embodiment of the present invention. Counter unit 1006 from FIG. 10 includes a counter 1200 and NOR gate 1202. NOR gate 1202 has its output connected to the enable input of counter 1200. The Command_Queue_Read signal is applied to the up/down input of counter 1200 and to the input of NOR gate 1202 to increment the count in counter 1200. The Completion_Queue_Write signal is applied to NOR gate 1202 to decrement the count in counter 1200. The Adapter_I/O_Clock signal is applied to the clock input of counter 1200 to generate an output containing the active count (Active_Count), which is sent to a scaling unit, such as scaling unit 1008 in FIG. 10. The Command_Queue_Read signal is used to indicate the start of an I/O task while the Command_Queue_Write signal is used to indicate the completion of an I/O task from the prospective of the adapter or slave processor.

Figure 13:
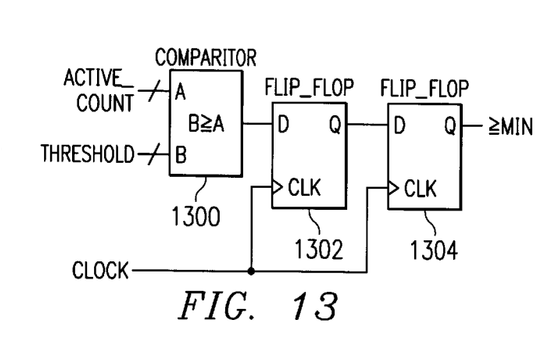
FIG. 13 is a logic diagram of hardware in a scaling unit used to determine whether the active count is greater than or equal to a minimum threshold value in accordance with a preferred embodiment of the present invention.

Turning next to FIG. 13, a logic diagram of hardware in a scaling unit used to determine whether the active count is greater than or equal to a minimum threshold value in accordance with a preferred embodiment of the present invention. Comparator 1300 receives the Active_Count value as a first input and a threshold value (Threshold) as a second input. An output is generated if the Active_Count value is greater than the threshold. The output of comparator 1300 is connected to the D input of D flip-flop 1302, which in turn has its output connected to the D input of D flip-flop 1304. These two flip-flops have their clock inputs connected to a clock signal. This clock signal is a periodic signal that is used to drive state machine transitions. D flip-flops 1302 and 1304 act as a synchronizer to generate an output signal (≧min), which is sent to programmable delay 1010 in FIG. 10.

With reference now to FIG. 14, a logic diagram of hardware in a scaling unit used to implement scaling methods is depicted in accordance with a preferred embodiment of the present invention. Programmable Logic Array (PLA) unit 1400 implements a scaling method, such as a single step scaling method or a multi-scale method as described above. PLA unit 1400 receives a maximum delay value (Maximum), the Active_Count, and a step value (Step). The output is a scaled count value (Scaled_Count), which is sent to programmable delay unit 1010.

Figure 15:
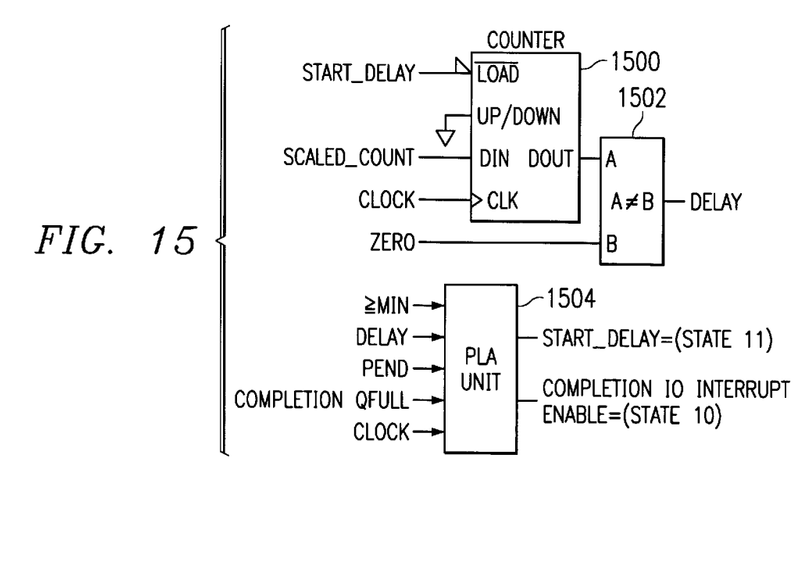
FIG. 15 is a logic diagram of hardware in the programmable delay unit in accordance with a preferred embodiment of the present invention.
Figure 16:
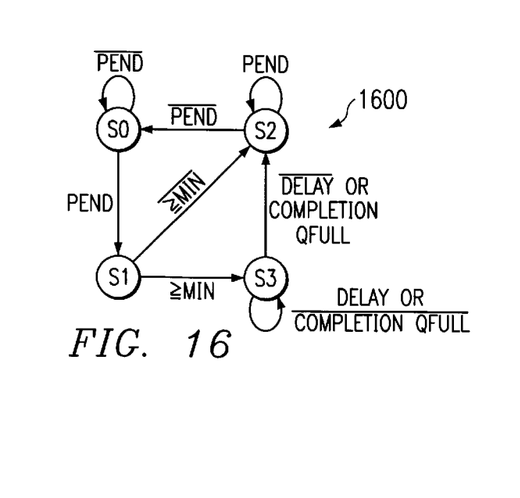
FIG. 16 is a state machine diagram of the state machine in accordance with a preferred embodiment of the present invention.

Turning now to FIG. 15, a logic diagram of hardware in the programmable delay unit is depicted in accordance with a preferred embodiment of the present invention. Counter 1500 is connected to comparator 1502, which in turn is connected to programmable logic array (PLA) 1504, used to implement a state machine with a state diagram as illustrated in FIG. 16 below. PLA 1504 is used to control the completion interrupt sent to the host or master processor. Counter 1500 receives a start delay signal (Start_Delay) to its load input from PLA 1504. A Scaled_Count value is received from the scaling unit as an input. Counter 1500 is clocked by a clock signal. The start delay signal holds the counter in a load state until the controlling state machine transitions to S3 as described below in FIG. 16. The output of counter 1500 is connected to one input of comparator 1502. The other input of comparator 1502 receives a logic zero as an input. Comparator 1502 is used to determine when the delay set by the Scaled_Count value has expired. The output of comparator 1502 provides a delay signal (DELAY) that is an input into PLA 1504. In addition, PLA 1504 also receives a ≧ min signal from scaling unit 1008 and the PEND signal from completion queue 1004 and Completion Q Full signal from completion queue 1004. PLA 1504 is driven by a clock signal (CLOCK).

With reference now to FIG. 16, a state machine diagram of the PLA in FIG. 15 is depicted in accordance with a preferred embodiment of the present invention. State machine 1600 begins in state S0 and stays in this state until an interrupt is pending, which is indicated by PEND. In state S0, no entries are pending in completion queue 1004. When an interrupt is pending, state machine 1600 transitions into state S1, which checks to see if the number of active I/O tasks is greater than or equal to a minimum threshold as indicated by ≧ min signal generated by the scaling unit. If the number of active I/O tasks is less than the minimum threshold, state machine 1600 then transitions into state S2 in which a completion I/O interrupt is enabled immediately. The interrupt continues to be asserted until signal PEND is no longer active. At that time, state machine 1600 returns to state SO. If in state S1, the number of active I/O tasks is greater than or equal to the minimum threshold value, state machine 1600 then transitions state S3 in which a delay occurs until the delay set in counter 1500 expires or until the Completion Q Full signal from completion queue 1004 is active. When the delay expires, state machine 1600 transitions from state S3 to state S2 to enable a completion I/O interrupt.

Thus, the present invention provides an improved method and apparatus for generating interrupts. The present invention provides a method and apparatus for I/O interrupts in a manner that balances performance and latency. The present invention increases processing efficiency which allows a user to achieve the full performance potential of the data processing system and enjoy more linear performance scaling if processing units are added to the data processing system. In particular, the present invention balances I/O latency with I/O interrupt processing overhead for optimal data processing performance. In addition, the present invention allows for I/O performance optimization by adjusting to interrupt processing overhead and changes in I/O workload profile as described above. The present invention may be implemented in hardware, software, or hybrid of both of hardware and software. The present invention is equally useful in server or workstation platforms having high or low I/O interrupt overhead. Furthermore, the present invention is applicable to any command or completion queue type I/O interface and does not prohibit the use of I/O concatenation techniques.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. For example, although the depicted examples show incrementing a counter value each time a task is read and decrementing a counter each time a task is completed, the counter value could be decremented each time a task is read and incremented each time a task is completed. The embodiment was chosen and described in order to best explain the principles of the invention the practical application to enable others of ordinary skill in the art to understand the invention for various embodiments with various modifications as are suited to the particular use contemplated.

What is claimed is:

1. An input/output interface for generating an interrupt signal comprising:

a counter, wherein the counter contains a value that is altered in a first direction each time a task is begun and altered in an opposite direction from the first direction each time a task is completed;

a scaling unit connected to the counter, wherein the scaling unit converts the value in the counter into a delay value; and a programmable delay unit connected to the scaling unit, wherein the programmable delay unit generates the interrupt signal after a period of time determined by the delay value.

2. The input/output interface of claim 1, wherein the programmable delay unit receives a threshold value and immediately generates the interrupt signal if the value is less than a selected threshold value.

3. The input/output interface of claim 1, wherein a task is begun by reading the task from a command queue.

4. The input/output interface of claim 1, wherein a task is written into a completion queue when the task is complete.

5. The input/output interface of claim 1, wherein the input/output interface is located in an adapter.

6. The input/output interface of claim 1, wherein altering the value in the first direction involves incrementing the value and altering the value in the opposite direction involves decrementing the value.

7. A method for generating interrupts comprising:

changing a counter value in a first direction each time a task is completed;

changing the counter value in a direction opposite to the first direction each time a task is begun;

determining a delay value using the counter value; and generating an interrupt after a period of time as determined by the delay value.

8. The method of claim 7, wherein the step of determining a delay value includes scaling the counter value using a scaling method.

9. The method of claim 7 further comprising:

comparing the counter value to a threshold value; and generating an interrupt upon detecting a condition in which the counter value is less than the threshold value instead of after the period of time.

10. The method of claim 7, wherein completed tasks are written into a completion queue and further comprising:

monitoring the completion queue to detect a condition in which the completion queue is full; and generating the interrupt prior to the period of time in response to the condition in which the completion queue is full.

11. The method of claim 7, wherein the step of determining a delay value includes scaling the counter value.

12. The method of claim 7, wherein the task is completed by a slave processor and the task is begun by the slave processor.

13. An apparatus for generating interrupts comprising:

decrementing means for decrementing a counter value each time a task is completed by a slave processor;

incrementing means for incrementing the counter value each time a task is read by the slave processor;

determining means for determining a delay value using the counter value; and interrupt generation means for generating an interrupt after a period of time set by the delay value.

14. The apparatus of claim 13, wherein the step of determining a delay value includes scaling the counter value using a scaling method.

15. The apparatus of claim 14, wherein the scaling method is a single step scaling method.

16. The apparatus of claim 15, wherein the scaling method is a multistep scaling method.

17. The apparatus of claim 13, wherein the interrupt generation means is a first generation means and further comprising:

comparison means for comparing the counter value to a threshold value; and second interrupt generation means for generating an interrupt upon detecting a condition in which the counter value is less than the threshold value instead of after the period of time.

18. The apparatus of claim 13, wherein the apparatus is located on an adapter.

19. The apparatus of claim 13, wherein completed tasks are written into a completion queue and further comprising:

monitoring means of monitoring the completion queue to detect a condition in which the completion queue is full; and generating means for generating the interrupt prior to the period of time in response to the condition in which the completion queue is full.

20. A computer program product for generating interrupts, the computer program product comprising:

a computer useable medium;

first instructions for changing a counter value in a first direction each time a task is completed;

second instructions for changing the counter value in a opposite direction to the first direction each time a task is begun;

third instructions determining a delay value using the counter value; and fourth instructions for generating an interrupt after a period of time determined by the delay value has passed, wherein the instructions are embodied on the computer readable medium.

21. The computer program products of claim 20 further comprising:

fifth instructions for comparing the counter value to a threshold value; and sixth instructions for generating an interrupt upon detecting a condition in which the counter value is less than the threshold value instead of after the period of time.

22. The computer program product of claim 20, wherein completed tasks are written into a completion queue and further comprising:

fifth instructions for monitoring the completion queue to detect a condition in which the completion queue is full; and sixth instructions for generating the interrupt prior to the period of time in response to the condition in which the completion queue is full.

23. The computer program product of claim 20, wherein the computer useable medium is a floppy disk.

24. The computer program product of claim 20, wherein the computer useable medium is a read only memory.

25. The computer program product of claim 20, wherein the instructions are executed by a processor located on an input/output adapter.

26. The computer program product of claim 20, wherein the first instructions for changing a counter value in a first direction each time a task is completed comprises incrementing the counter value each time a task is completed.

27. The computer program product of claim 20, wherein the second instructions for changing the counter value in a opposite direction to the first direction each time a task is begun comprises decrementing the counter value each time a task is begun.

28. The computer program product of claim 20, wherein the task is completed by a slave processor.

29. The computer program product of claim 20, wherein the task is begun by a slave processor.

* * * * *